May 17, 1927.

L. G. OUELLET 1,629,296

COASTER BRAKE

Filed June 24, 1926

INVENTOR
BY Louis Gérard Ouellet
ATTORNEY

Patented May 17, 1927.

1,629,296

UNITED STATES PATENT OFFICE.

LOUIS GÉRARD OUELLET, OF ST. ANACLET, QUEBEC, CANADA.

COASTER BRAKE.

Application filed June 24, 1926. Serial No. 118,175.

This invention relates generally to coaster brakes, used on bicycles and the like, the invention having more particular reference to a novel type of coaster brake.

The invention has for an object the provision of an improved coaster brake embodying more efficient braking qualities.

For further comprehension of the invention, and of the objects and advantages thereof, reference will be had to the following description and accompanying drawing, and to the appended claims in which the various novel features of the invention are more particularly set forth.

Fig. 1, of the drawing, is a side elevational view of my improved coaster brake, in an engaged or driving position, partly in section so as to expose certain interior parts.

The hub 10, the driven member 11, the driving member 12 are those of a common, ordinary coaster brake such as generally used on bicycles and the like, as a means of permitting the rider of the said bicycle to coast, or to cease pedaling, and to apply the brake, so as to stop the said bicycle.

Figure 1:
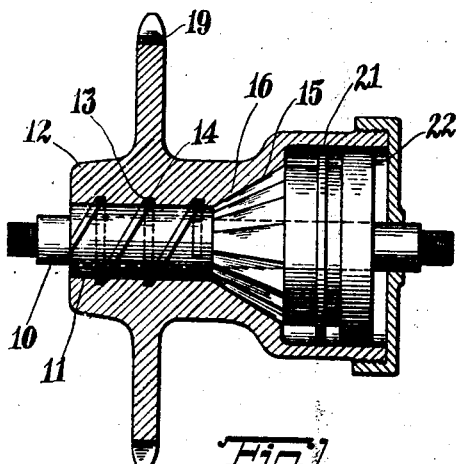
Figure 3:
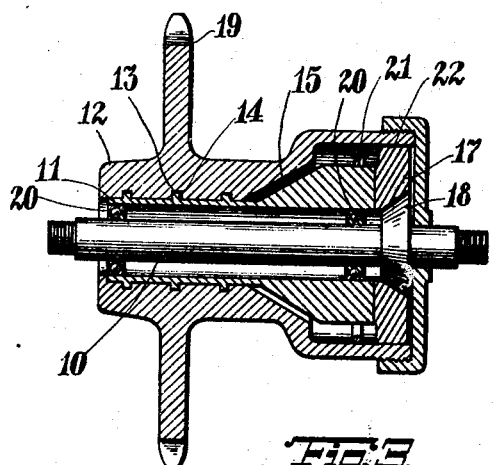
Fig. 3, is a vertical central sectional view thereof, in a braking position.
Figure 2:
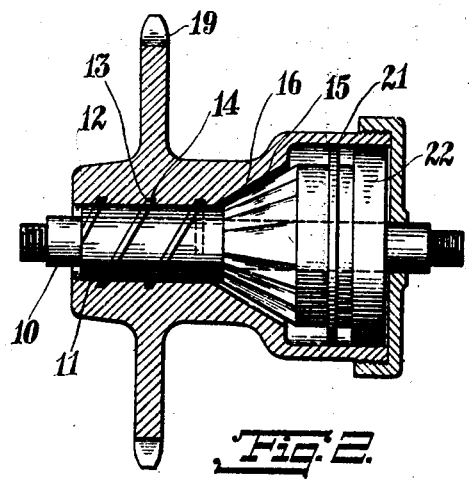
Fig. 2, is a similar view of my improved coaster brake in a disengaged or free position.

It being understood that the thread 13, formed or cut on the periphery of the driven member 11, engaging with a thread 14, formed or cut in the driving member 12, will permit the rear wheel of the said bicycle to be driven, or to run free by engaging or disengaging the tapered portion 15 of the driven member 11 with the tapered recess 16 of the driving member 12, as clearly shown in Figs. 1, and 2 of the accompanying drawing. It being understood that the above described construction is such as will permit the thread 13 to engage the tapered recess 17 of the driving member 12, with the tapered portion 18, of the hub 10, so as to stop the said bicycle. It being further understood that the driving member 12 is provided with sprocket teeth 19, over which a sprocket chain, not shown in the accompanying drawing is extended so as to drive the said driving member 10, as is common to bicycles and the like. It being also understood that the driving member 11 is mounted on suitable ball bearings 20, or the like, and that a spring 21, is employed to centralize the free extremity 22 of the driven member 11, as is common to coaster brakes generally used on bicycles or the like.

Figure 4:
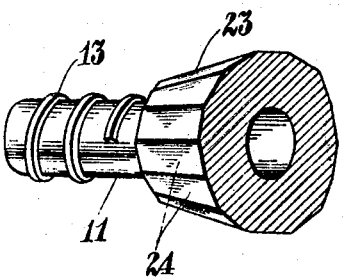
Fig. 4, is a perspective detail view thereof.

Referring in particular to Fig. 4, of the accompanying drawing, the tapered portion 23 of the driven member 11, is provided with a plurality of sides, so as to form edges 24, so as to enable the above referred to tapered recess 16, of the driving member 12 to more firmly grip the tapered portion 23, so as to prevent slippage when driving the said rear wheel of the said bicycle.

Figure 5:
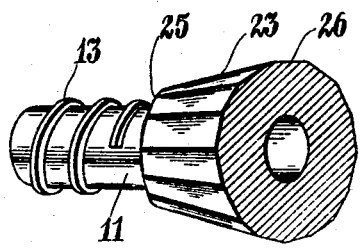
Fig. 5, is a perspective detail view showing a modification of my improved device.

Referring in particular to Fig. 5, of the accompanying drawing, showing a modification of the driven member as used in combination with my improved device, the tapered portion 23 of the above referred to driven member 11 is formed or cut circular, as at 25, at its smaller end, and is provided with a plurality of sides 26, at its larger end so as to enable the above referred to tapered recess 16, of the driving member 12, to gradually or smoothly engage or grip the tapered portion 23 for the purpose as hereinbefore stated.

It will be understood that I do not necessarily limit my invention to the particular design of coaster brake as above described, but to coaster brakes of all classes and description employing a tapered recess and a tapered portion as a means of driving the rear wheel of a bicycle or the like.

Having thus described my invention, what I claim as new, and desire to protect by Letters Patent of the United States, is as follows:—

1. In a coaster brake of the class described, a driven member comprising a tapered portion formed circular at its smaller end and provided with a plurality of sides at its larger end.

2. In a coaster brake of the class described, a driven member comprising a tapered portion formed circular at its smaller end and provided with a plurality of sides at its larger end, adapted to be engaged by a tapered recess of a driving member, so as to permit the said driving member to drive the said driven member.

In testimony whereof I have affixed my signature.

LOUIS GÉRARD OUELLET.